REMOVABLE LINE SHIELD FOR SPINNING REEL SPOOLS

Original Filed March 5, 1964 3 Sheets-Sheet 1

Inventors
Clifford E. Willis and
Gerald D. Harrington
By
Gordon W. Kuescher
Att'y

REMOVABLE LINE SHIELD FOR SPINNING REEL SPOOLS

Original Filed March 5, 1964 3 Sheets-Sheet 2

Inventors
Clifford E. Willis
Gerald D. Harrington
By
Swanson & Kurschner
Atty's

REMOVABLE LINE SHIELD FOR SPINNING REEL SPOOLS

Original Filed March 5, 1964 3 Sheets-Sheet 3

Inventors
Clifford E. Willis and
Gerald D. Harrington
By
Ingram M. Fuesschen
Att'y United States Patent Office Re. 27,205
Reissued Oct. 26, 1971

27,205

REMOVABLE LINE SHIELD FOR SPINNING REEL SPOOLS

Clifford E. Willis, Fayetteville, Ark., and Gerald D. Harrington, Kalamazoo, Mich., assignors to Shakespeare of Arkansas, Inc., Fayetteville, Ark.

Original No. 3,329,371, dated July 4, 1967, Ser. No. 349,568, Mar. 5, 1964. Application for reissue Dec. 9, 1968, Ser. No. 796,936

Int. Cl. A01k *89/04*

U.S. Cl. 242—84.2 R 12 Claims

Matter enclosed in heavy brackets [ ] appears in the original patent but forms no part of this reissue specification; matter printed in italics indicates the additions made by reissue.

*ABSTRACT OF THE DISCLOSURE*

*A spinning reel comprises a housing, an axially movable shaft rotatably mounted in the housing, means for rotating the shaft, line pick-up means affixed to the shaft, means for providing forward axial movement of the shaft, a normally stationary line spool coaxially mounted on the shaft, and an annular spool flange detachably mounted on the periphery of the front wall of the spool. The annular spool flange comprises an axial wall positioned over the edge of the front wall of the spool and which extends rearwardly of the front wall. A line drawn axially from the spool rides on the flange when the line pick-up means is disengaged.*

The present invention relates to spining reels of the closed-face type and is more particularly concerned with a novel spool and spool flange structure which provides improved operation and convenience, and with spinning reels embodying the same.

Lower-priced spinning reels of the closed-face type generally do not have provision for level winding, since such a structure would add greatly to the complexity and cost of the reel. Consequently, the lip or edge of the pick-up member, whether it be of the pin-type or tooth-type, is generally positioned during line retrieve so that the line is fed to the spool at a point near the midpoint between the two flanges of the spool. This results in an orderly winding up of the line on the reel.

When the spinning reel is placed in condition for casting, the pick-up member must be moved a sufficient distance forward so that its edge no longer engages the line, and the line is free to pay out. When a line spool having straight flanges is used, and particularly if the pick-up member is of the toothed type, the pick-up member must be moved forward a considerable distance before the line is free of the pick-up teeth. Frequently this forward movement exposes an area or slot between the spool forward wall and the teeth of the pick-up member, which area or slot allows line to fall in front of the spool and to tangle on the shaft. In order to avoid this difficulty, the edge of the forward wall of the spool is generally turned rearwardly. This permits the pick-up member to be adequately cleared by a considerably smaller forward axial movement of the pick-up member, which axial movement is then sufficiently small so that no space is exposed between the rear edge of the pick-up member and the forward wall of the spool. Such an arrangement has several advantages. First, it permits a smaller forward axial movement of the pick-up member for clearing the line. As a result, the reel may be made more compact. Additionally, the smaller forward movement of the pick-up member clears the line without forming an open space between the pick-up member and the reel in which line may be tangled. A further advantage of the turned back spool flange is that it permits the line to be unwound more evenly during the casting operation.

Although the turned back flange arrangement offers the advantages described above, it is at the same time subject to certain previously unavoidable disadvantages. One disadvantage results from the fact that the flange is integral with the spool and therefore must be of the same material as the spool. Since the spools are generally die-cast, there may be rough edges which tend to wear and eventually to cut the line as it is payed out. The turned-back flanges of the prior art present still another disadvantage. Occasionally the line snaps at the spool or is completely drawn into the spool. Since the turned-back flange is integral with the spool, it cannot be removed, and the line must be retrieved through the diminished open space between the two flanges of the spool, which to say the least presents a substantial and annoying problem even for the most experienced angler.

It is accordingly an object of the present invention to provide a spool for a spinning reel having a turned-back flange which is formed of a material having a low coefficient of friction. It is a further object of the invention to provide a spool assembly of the type described in which the turned-back flange is readily removable and replaceable and which, when once engaged with the front wall of the spool, remains in place during normal operation of the reel. It is a further object to provide a closed-face spinning reel having a spool with removable turned-back flange of the type described, wherein the line being wound onto or unwound from the spool will wind or unwind from the same position. It is an additional object to provide a mechanism of the type described which is simple and which may be inexpensively manufactured. Additional objects will be apparent to one skilled in the art and still other objects will become apparent hereinafter.

According to the invention, a spinning reel of the closed-face type is provided having a line spool to which a removable annular spool flange is affixed at the periphery of the forward wall of the spool. The annular flange has an axial wall which extends to a point intermediate the front and rear walls of the spool. Consequently, when the pick-up member is in its advance position and line is being payed out, the line rides on the lip of the axial wall and outer surface of the flange, which is preferably made of a material such as a synthetic plastic having a low coefficient of friction.

Reference is now made to the accompanying drawings for a better understanding of the invention, wherein all of the parts are numbered and wherein the same numbers are used to refer to corresponding parts throughout.

Figure 1:
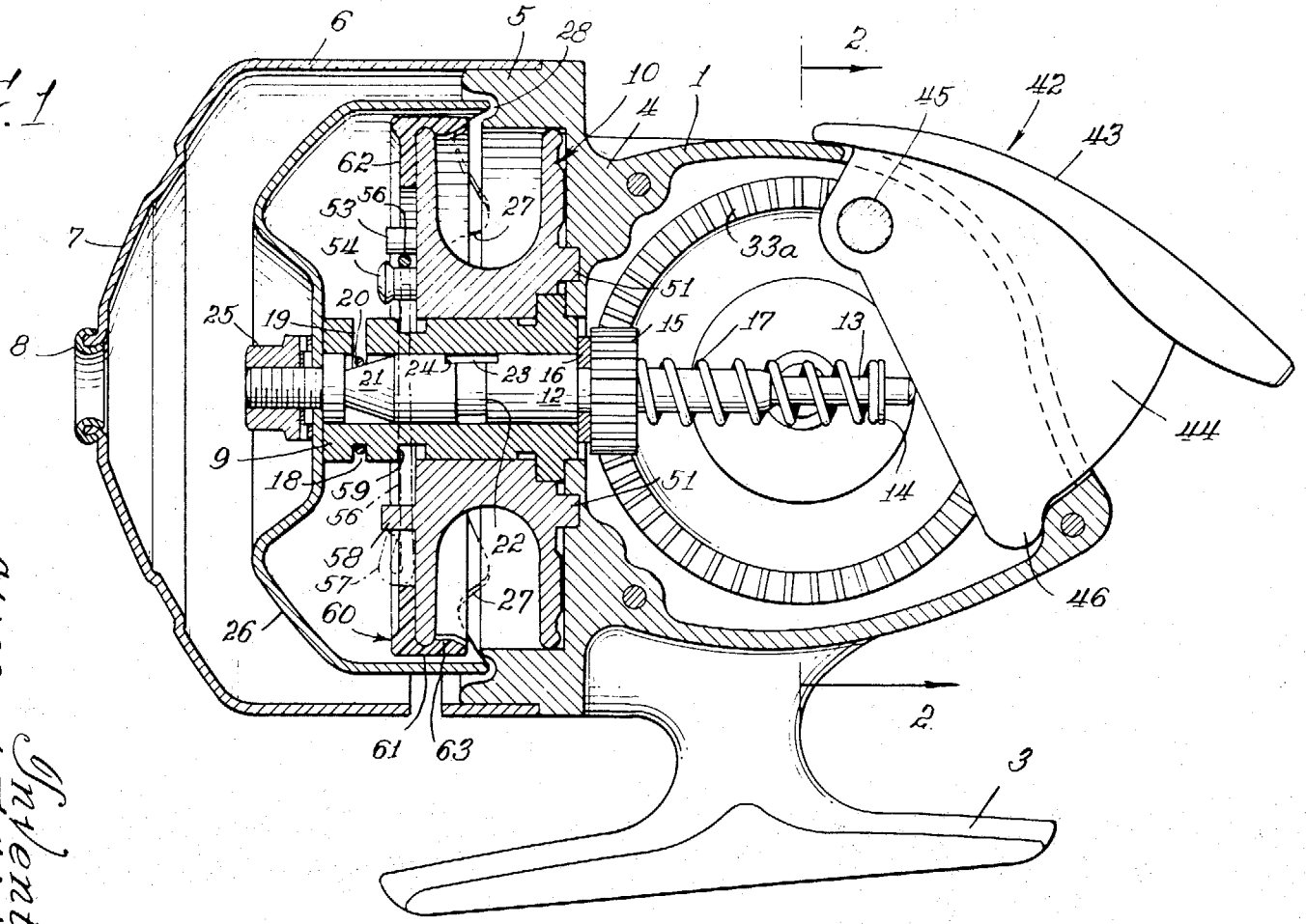
FIG. 1 is a vertical sectional view in the plane of the axis of the reel of the present invention.
Figure 2:
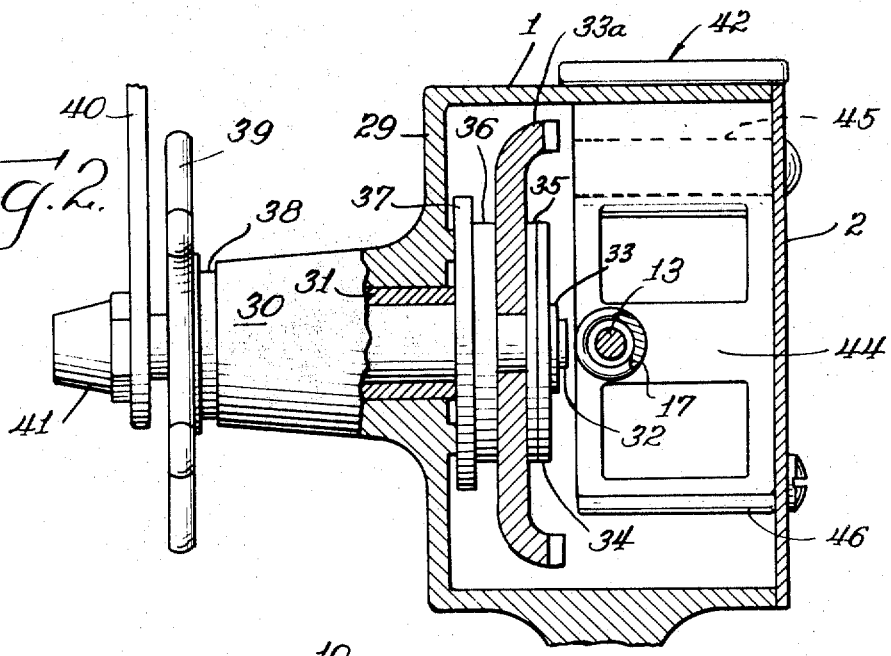
FIG. 2 is a partial cross-sectional view taken at the line 2—2 of FIG. 1.
Figure 3:
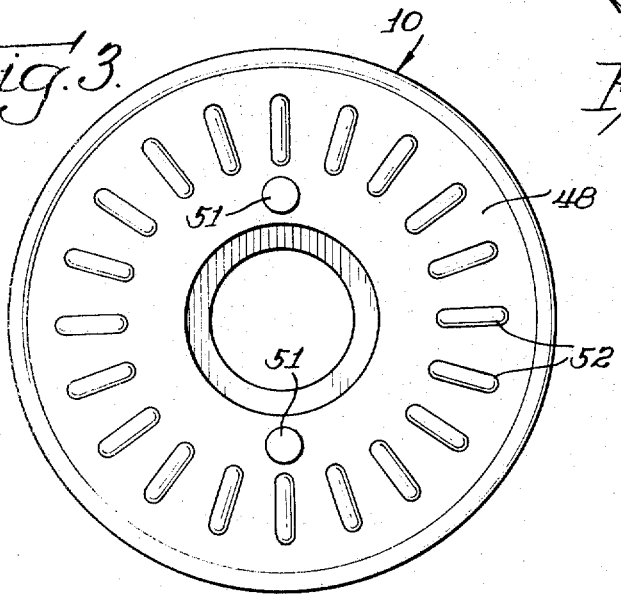
FIG. 3 is a rear view of a spool.
Figure 4:
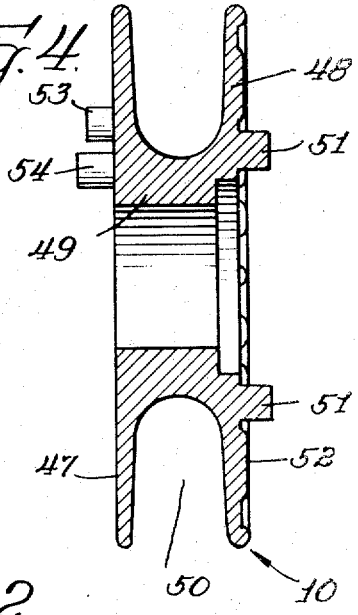
FIG. 4 is a side elevation of the spool of FIG. 3.

Referring now to the drawings, the reel, as shown in FIGS. 1 and 2, comprises a gear housing 1 having a removable cover plate 2. A reel seat 3 is integrally molded together with the gear housing 1. The front wall 4 of the gear housing has a forwardly projecting flange-like head portion 5 which may be peripherally threaded to receive the edge of a cap member 6. Where threads are provided on the head portion 5, the edge of the cap may be provided with complementary threads to be screwed thereover. Alternatively, the cap may be slidably mounted over the flange-like head portion 5. The cap member 6 has a conical portion 7 provided with a line-guide eye 8 at the apex thereof.

A main bearing 9 is fixedly positioned with regard to front wall 4 by means of an axial bore provided therefor. Mounted over the main bearing 9 is a stationary thread or line spool 10.

A main shaft 12 is journalled through the bore of the main bearing 9 and is free both to rotate and to travel axially. At the reduced end 13 of the main shaft 12 is a snap ring 14 maintained in a groove provided therefor. A pinion gear 15 is slidably mounted over a portion of the main shaft having a square cross section. The bore of the pinion gear has a complementary square cross section so that it may be driven by the main shaft, but yet is free to move axially with respect thereto. A washer 16 serves to space the pinion gear 15 and the main bearing 9. A helical compression spring 17 engaging the pinion gear 15 at one end and the snap ring 14 at the other provides a rearward biasing force for the main shaft 12.

At the forward end of the main bearing 9, an annular groove 18 is provided at one side with a notch 19 communicating with the bore of the main bearing 9 at the other side. A circular detent spring 20 rides in the annular groove 18 in a radially inward biased state. The main shaft 12 is provided with a cam taper 21 designed to expand the spring 20 when the main shaft is advanced forward axially. The main shaft 12 is also provided with a detent notch or groove 22 which is engaged by the detent spring 20 when the main shaft 12 is pushed forward axially. The main shaft is thereby retained in a forward position. A cam notch 23 is also provided, forming a step with the detent notch. As a result of this structure, when the main shaft is in the forward position and is retained by the spring 20, rotation of the main shaft causes the step 24 to provide a cam action for the spring 20 and spread it open, releasing the main shaft and permitting the spring 17 to return it to its normal position.

Affixed to the end of the main shaft 12 by means of a nut 25 is a cup-form line pick-up member 26, the lip of which is provided with a plurality of line pick-up teeth 27. An annular groove 28 is provided at the forward edge of the head portion 5 which cooperates with the toothed edge of the pick-up member 26 to pick up the line and wind it on the reel 10 when the pick-up member is rotated. This occurs only when the pick-up member 26 is in its rearwardmost position. When the main shaft 12 is moved forward to the position where it is retained by the detent spring 20, the line slides over the pick-up teeth 27 and is thus free to pay out, as during a cast or otherwise.

As shown in FIG. 2, a crank shaft housing 30, in which is rotatably journalled a sleeve 31, is mounted on a side wall 29 of the gear housing. Within the sleeve is journalled a crank shaft 32 having a snap ring 33 affixed to one end thereof. Mounted over the crank shaft is a combination assembly comprising a beveled driving gear 33a and an adjustable drag assembly. The beveled driving gear 33a is arranged to mesh with the pinion gear 15. The adjustable drag assembly comprises a rigid washer 34, friction discs 35 and 36 which may be of any suitable friction material, and a rigid retaining disc 37. The sleeve 31 is provided with a flange 38 to retain it in position. Mounted over a threaded portion of the crank shaft is a drag adjusting wheel 39. As the wheel 39 is tightened, the gear 33a is compressed between the friction discs 35 and 36. When the force caused by a pull on the line is greater than the friction established by the assembly, the gear 33a slides or rotates even though the crank shaft is maintained in a stationary position, thus permitting the line to pay out. A crank 40 is affixed to a reduced and threaded end of the crank shaft by means of a nut 41.

The arrangement for moving the main shaft 12 and the line pick-up member 26 axially forward from their rearwardmost position to their forwardmost position, as shown in FIG. 1, comprises a thumb push-button lever 42 having a curved flange 43 and a web 44. The push-button lever 42 pivots on a pillar 45 mounted on the cover plate 2. The web 44 is provided with a detent 46 engaging a portion of the housing 1 to prevent the web 44 from leaving the housing. The forward edge of the web 44 engages the end of the main shaft 13.

As shown in FIGS. 3–7, the spool 10 comprises a front wall 47, a rear wall 48, and an axial portion 49 cooperating to define an annular groove 50 about which the line is wound. On the rear wall 48 are a pair of bosses 51. When mounted in the reel, the bosses are inserted into openings provided therefor in the front wall 4 of the gear housing in order to restrain rotation of the spool. A plurality of ribs 52 may be provided to space the surface of the rear wall 48 apart from the front wall 4 of the housing. The front wall 47 is provided with flare studs 53, 54 and 55 about which 55 is mounted a retention spring 56 having a loop 57 at its free end for finger engagement. A dual position detent 58 engages and positions the free end of the retention spring 56. The detent is shown in detail in FIG. 7, the portion 58a being utilized to position the spring for removal of the reel. When the spool 10 is inserted over the spool supporting member, such as the main bearing 9, with the retention spring 56 in the engaging position, the spring is engaged by a retention groove 59 provided in the main bearing 9, and axial movement of the spool is restrained thereby.

Figure 8:
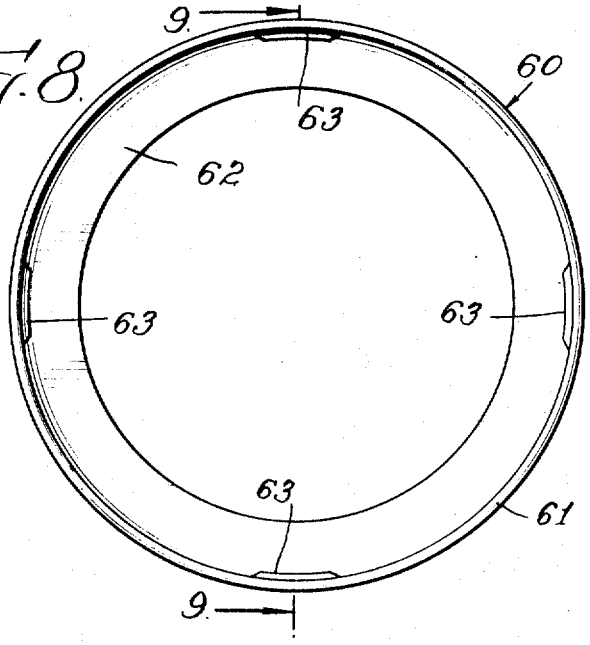
FIG. 8 is a rear view of a spool flange according to the invention.
Figure 9:
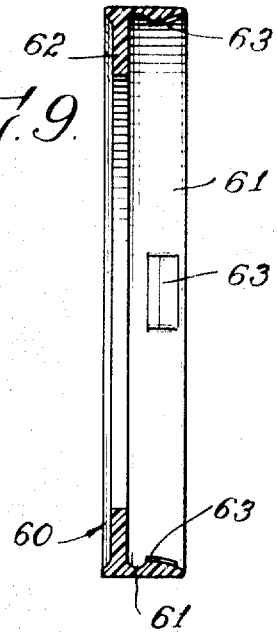
FIG. 9 is a cross-section taken at the line 9—9 of FIG. 8.
Figure 5:
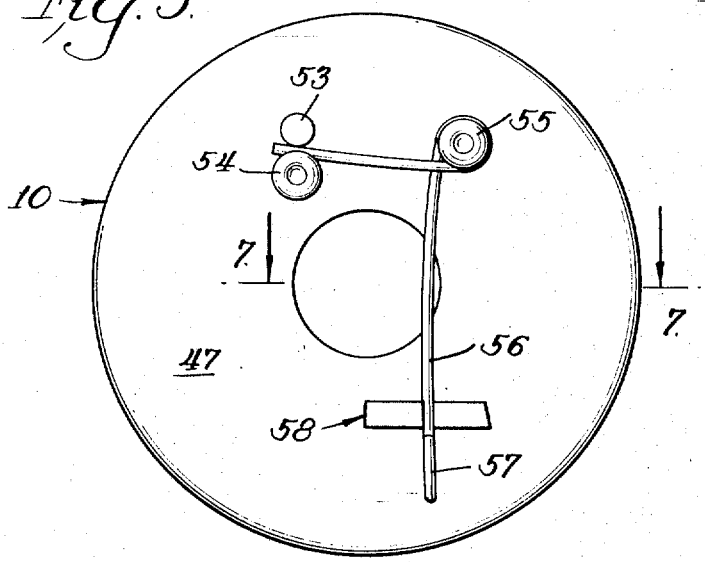
FIG. 5 is a front view of the spool showing the retaining structure.
Figure 6:
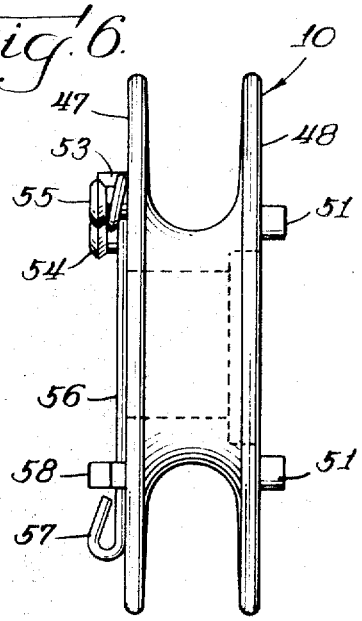
FIG. 6 is a side view of the structure shown in FIG. 5.
Figure 7:
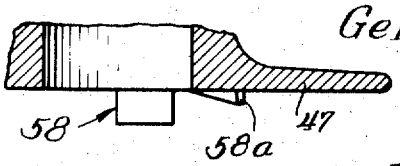
FIG. 7 is a fragmentary view of a portion of the spool showing the detent structure for positioning the retention spring.

As shown in detail in FIGS. 8 and 9, the primary feature of the invention comprises an annular spool flange 60 having an axial wall 61 and a radial wall 62. The axial wall is provided with a plurality of interference ribs 63 for retaining the annular spool flange 60 on the edge of the front wall 47 of spool 10.

Figure 10:
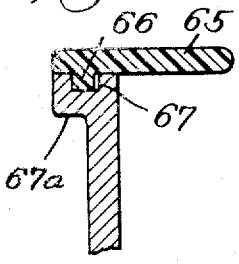
FIG. 10 is a fragmentary view of another embodiment of the present invention.

Although the means for engaging the spool flange of the present invention with the spool is preferably of the interference rib type shown in FIGS. 1, 8 and 9, other means may be used. In FIG. 10 is shown a bayonet lock type in which the axial wall 65 of the flange has a bayonet protrusion 66 engaging a mating socket 67 provided in the spool wall edge 67a.

Figure 11:
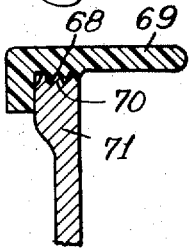
FIG. 11 is a fragmentary view of still another embodiment.

In FIG. 11 is shown an engaging means wherein a threaded portion 68 of the flange 69 engages a threaded portion 70 of the spool 71. In the embodiments of FIGS. 10 and 11 it is not necessary that the flange have a radial wall.

Figure 12:
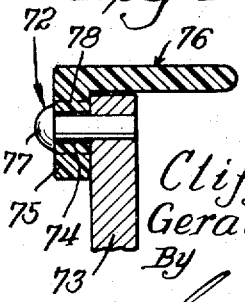
FIG. 12 is a fragmentary view of an additional embodiment.

In FIG. 12 is shown still another embodiment in which a bayonet lock 72 on the spool 73 engages with a key hole slot 74 provided in the radial wall 75 of the flange 76. The flange is removed by twisting until the head 77 of the bayonet lock reaches the enlarged portion of the keyhole slot 78 which permits the head to pass therethrough.

The spool flange 60 is advantageously designed so that the rear edge of the axial wall is superimposed vertically over a point intermediate the spool front wall 47 and the spool rear wall 48, and preferably equidistant therebetween. This enables the line to be unwound from the reel at substantially the same angle at which it is wound thereon, to prevent snagging between adjacent or overlapping coils of line. If desired the axial wall may also extend a distance forward of the radial wall to prevent line from falling over the front of the flange and becoming wound upon the shaft. The spool flange is preferably made of plastic material such as nylon, polypropylene, polyethylene, polystyrene, phenolic resins, or other plastic material having a relatively low coefficient of friction with respect to the line. The rear edge of the axial wall of the spool flange as well as the outer surfaces of the axial and radial walls should be provided with as smooth a finish as possible to prevent cutting or abrasive action on the line and to allow free flow during cast.

The spool is inserted in the reel by placing it over the main bearing 9. The retention spring 56 engages the groove 59 or other detent means provided in the main bearing 9. When it is desired to remove the spool, the retention spring 56 is moved over to the second position 58a of the dual position detent (see FIG. 7), disengaging it from the groove 59. The spool is then free to slide off the main bearing 9.

Normally the structure of the invention has the arrangement shown in FIG. 1 with the pick-up member 26 engaging the line. In order to cast, the push-button lever 42 is depressed. This results in the main shaft and the pick-up member being moved forward axially until the forward edge of the pick-up member engages the forward wall of the cap 6 and snubs the line therebetween. As a result, the line is secured. A cast is then made, at the end of which the push-button lever 42 is released. The pick-up member returns to its intermediate position in which the detent groove 22 is engaged by the detent spring 20. In this position the line is released and is free to be payed out, since the teeth 27 are not in engagement with the annular groove 28. As the line is unwound from the spool, it rides over the relatively frictionless edge and outer surface of the axial wall 61 of flange 60. If desired, any click or ratchet means commonly used in the art may be utilized in conjunction with the present reel structure to prevent reverse rotation of the pick-up member and the gears. Such ratchet means, although not shown, may comprise ratchet teeth provided on the edge of disc 37, which disc is keyed to stem 32, cooperating with suitable pawl means. The length of the cast may be terminated by once again depressing the push-button 42 and snubbing the line. In order to retrieve the line, the crank is turned, expanding the detent spring 20 and permitting the pick-up member 26 to return to its normal pick-up position with teeth 27 in groove 28 as shown in FIG. 1.

The spool and flange assembly of the present invention is designed to be used in closed face spinning reels of the type in which the spool is normally stationary. As used herein, this term means that the spool does not rotate during the cast or during retrieve. However, in some embodiments the spool may rotate when the line is withdrawn against an adjustable drag, and means may be provided for controlling the friction exerted by the reel against a friction member so that the drag may be accurately controlled. In the embodiment shown in the drawings, the spool is not only normally stationary, but permanently stationary while inserted in the reel, since adjustable drag is provided by the device in the crank assembly shown in FIG. 2.

The spool and flange of the invention have been shown in the drawings as used in a reel having a tooth-type pick-up member. However, it is equally adaptable to use with spinning reels having a pin-type pick-up member, which type of pick-up is well known in the art. The pick-up member is advanced to a forward position during casting for withdrawing the pick-up pin and snubbing the line. This exposes the spool flange to the line. Upon termination of the casting motion, the line is released and the pick-up member returns to an intermediate position, in some embodiments still leaving the flange exposed with the line riding thereon as it is payed out. During retrieve, the pick-up member returns to its rearward position and once again controls the position from which the line is wound onto the spool.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. A spinning reel comprising a housing, a shaft mounted rotatably in said housing and being axially movable and spring-biased axially rearwardly, means for rotating said shaft, and line pick-up means affixed to said shaft, means for providing forward axial movement of said shaft comprising a push-button lever means pivotally mounted in said housing and means associated therewith engaging the inner end of said shaft, a normally stationary line spool having a front wall coaxially mounted over said shaft and an annular spool flange detachably mounted on the periphery of the front wall of said spool, said flange comprising an axial wall positioned over the edge of the front wall of said spool and extending rearwardly of said wall, and means for detachably securing said flange to the periphery of said front wall, whereby line drawn axially from said spool rides on said flange when said pick-up means is in disengaged position, wherein said means for detachably securing said flange to the periphery of said front wall comprises complementary screw threads providing on both said flange and said front wall.

2. A spinning reel comprising a housing, a shaft mounted rotatably in said housing and being axially movable and spring-biased aixally rearwardly, means for rotating said shaft, and line pick-up means affixed to said shaft, means for providing forward axial movement of said shaft comprising a push-button lever means pivotally mounted in said housing and means associated therewith engaging the inner end of said shaft, a normally stationary line spool having a front wall coaxially mounted over said shaft and an annular spool flange detachably mounted on the periphery of the front wall of said spool, said flange comprising an axial wall position over the edge of the front wall of said spool and extending rearwardly of said wall, and means for detachably securing said flange to the periphery of said front wall, whereby line drawn axially from said spool rides on said flange when said pick-up means is in disengaged position, wherein said means for detachably securing said flange to the periphery of said front wall comprises mating bayonet members.

3. A spinning reel comprising a housing, a shaft mounted rotatably in said housing and being axially movable and spring-biased axially rearwardly, means for rotating said shaft, and line pick-up means affixed to said shaft, means for providing forward axial movement of said shaft comprising a push-button lever means pivotally mounted in said housing and means associated therewith engaging the inner end of said shaft, a normally stationary line spool having a front wall coaxially mounted over said shaft and an annular spool flange detachably mounted on the periphery of the front wall of said spool, said flange comprising a radial annular wall engaging the front wall of said spool, an axial annular wall extending reawardly of said front wall, and means for detachably securing said flange to the periphery of said front wall, whereby line drawn axially from said spool rides on said flange when said pick-up means is in disengaged position, wherein said means for detachably securing said flange to the periphery of said front wall comprises a keyhole slot provided in said radial annular wall and lug means provided on said front wall having a retention head smaller than the enlarged portion of said keyhole slot and larger than the narrow portion of said keyhole slot.

4. A spinning reel comprising a housing, a shaft mounted rotatably in said housing and being axially movable and spring-biased axially rearwardly, means for rotating said shaft, and line pick-up means affixed to said shaft, means for providing forward axial movement of aid shaft comprising a push-button lever means pivotally nounted in said housing and means associated therewith ngaging the inner end of said shaft, a normally stationary ine spool having a front wall coaxially mounted over aid shaft and an annular spool flange detachably mounted on the periphery of the front wall of said spool, said lange comprising a radial annular wall engaging the front vall of said spool, an axial annular wall extending rearvardly of said front wall, and means for detachably ecuring said flange to the periphery of said front wall comprising a plurality of interference ribs arranged on he inner surface of said axial wall dimensioned to permit he edge of said front wall to snap-lock into engagement vith said annular flange, whereby line drawn axially from aid spool rides on said flange when said pick-up means s in disengaged position.

5. A spinning reel according to claim 4 wherein said nnular spool flange is comprised of a synthetic plastic naterial.

6. An assembly adapted to be mounted in a spinning reel comprising a line spool having front and rear walls, neans provided on said rear wall adapted to be engaged by said spinning reel to restrain rotation of said spool when mounted in said spinning reel, and an annular spool flange detachably mounted on the periphery of the front wall of said spool, said flange comprising a radial annular wall engaging the front wall of said spool, an axial annular wall extending rearwardly of said front wall, and means for detachably securing said flange to the periphery of said front wall, whereby line drawn axially from said spool can ride on said flange, wherein said means for detachably securing said flange to the periphery of said front wall comprises a keyhole slot provided in said radial annular wall and lug means provided on said front wall having a retention head smaller than the enlarged portion of said keyhole slot and larger than the narrow portion of said keyhole slot.

7. An assembly adapted to be mounted in a spinning reel comprising a line spool having front and rear walls, means provided on said rear wall adapted to be engaged by said spinning reel to restrain rotation of said spool when mounted in said spinning reel, and an annular spool flange detachably mounted on the periphery of the front wall of said spool, said flange comprising a radial annular wall engaging the front wall of said spool, an axial annular wall extending rearwardly of said front wall, and means for detachably securing said flange to the periphery of said front wall comprising a plurality of interference ribs arranged on the inner surface of said axial wall dimensioned to permit the edge of said front wall to snap-lock into engagement with said annular flange, whereby line drawn axially from said spool can ride on said flange.

8. An assembly adapted to be mounted in a spinning reel comprising a line spool having front and rear walls, means provided on said rear wall adapted to be engaged by said spinning reel to restrain rotation of said spool when mounted in said spinning reel, and an annular spool flange detachably mounted on the periphery of the front wall of said spool, said flange comprising an axial wall positioned over the edge of the front wall of said spool and extending rearwardly of said wall, and means for detachably securing said flange to the periphery of said front wall, whereby line drawn axially from said spool can ride on said flange, wherein said means for detachably securing said flange to the periphery of said front wall comprises complementary screw threads provided on both said flange and said front wall.

9. An assembly adapted to be mounted in a spinning reel comprising a line spool having front and rear walls, means provided on said rear wall adapted to be engaged by said spinning reel to restrain rotation of said spool when mounted in said spinning reel, and an annular spool flange detachably mounted on the periphery of the front wall of said spool, said flange comprising an axial wall positioned over the edge of the front wall of said spool and extending rearwardly of said wall, and means for detachably securing said flange to the periphery of said front wall, whereby line drawn axially from said spool can ride on said flange, wherein said means for detachably securing said flange to the periphery of said front wall comprises mating bayonet members.

10. An assembly according to claim 7 wherein said annular spool flange is comprised of a synthetic plastic material.

*11. A spinning reel comprising a housing, a shaft mounted rotatably in said housing and being axially movable and spring-biased axially rearwardly, means for rotating said shafts, and line pick-up means affixed to said shaft, means for providing forward axial movement of said shaft comprising a push-button lever means pivotally mounted in said housing and means associated therewith engaging the inner end of said shaft, a normally stationary line spool having a front wall coaxially mounted over said shaft and an annular spool flange detachably mounted on the periphery of the front wall of said spool, said flange comprising a radial annular wall engaging the front wall of said spool, an axial annular wall extending rearwardly of said front wall, and means for detachably securing said flange to the periphery of said front wall comprising at least one interference rib arranged on the inner surface of said axial wall dimensioned to permit the edge of said front wall to snap-lock into engagement with said annular flange, whereby line drawn axially from said spool can ride on said flange when said pick-up means is in disengaged position.*

*12. An assembly adapted to be mounted in a spinning reel comprising a line spool having front and rear walls, means provided on said rear wall adapted to be engaged by said spinning reel to restrain rotation of said spool when mounted in said spinning reel, and an annular spool flange detachably mounted on the periphery of the front wall of said spool, said flange comprising a radial annular wall engaging the front wall of said spool, an axial annular wall extending rearwardly of said front wall, and means for detachably securing said flange to the periphery of said front wall comprising at least one interference rib arranged on the inner surface of said axial wall dimensioned to permit the edge of said front wall to snap-lock into engagement with said annular flange, whereby line drawn axially from said spool can ride on said flange.*

References Cited

The following references, cited by the Examiner, are of record in the patented file of this patent or the original patent.

UNITED STATES PATENTS

| | | | |
|---|---|---|---|
| 2,000,372 | 5/1935 | Beck | 242—118.4 |
| 2,233,137 | 2/1941 | Lewis | 242—118.4 |
| 2,605,980 | 8/1952 | Atwood et al. | 242—118.61 X |
| 2,663,073 | 12/1953 | Bieber et al. | 242—118.61 X |
| 2,884,211 | 4/1959 | Holahan | 242—84.2 X |
| 2,989,266 | 6/1961 | Yeada | 242—84.2 |
| 2,992,789 | 7/1961 | Sardeson | 242—118.61 X |
| 3,061,230 | 10/1962 | Gayle | 242—84.2 |
| 3,223,346 | 12/1965 | Fowler | 242—84.2 |

FOREIGN PATENTS

| | | | |
|---|---|---|---|
| 1,114,733 | 12/1955 | France | 242—84.21 |
| 262,494 | 10/1949 | Switzerland. | |

STANLEY N. GILREATH, Primary Examiner